(12) United States Patent
Portisch et al.

(10) Patent No.: US 11,954,605 B2
(45) Date of Patent: Apr. 9, 2024

(54) SYSTEMS AND METHODS FOR INTELLIGENT LABELING OF INSTANCE DATA CLUSTERS BASED ON KNOWLEDGE GRAPH

(71) Applicant: SAP SE, Walldorf (DE)

(72) Inventors: Jan Portisch, Bruchsal (DE); Sandra Bracholdt, Dielheim (DE); Michael Hladik, Walldorf (DE); Oliver Huth, Worms (DE)

(73) Assignee: SAP SE, Walldorf (DE)

( * ) Notice: Subject to any disclaimer, the term of this patent is extended or adjusted under 35 U.S.C. 154(b) by 867 days.

(21) Appl. No.: 17/033,357

(22) Filed: Sep. 25, 2020

(65) Prior Publication Data
US 2022/0101151 A1 Mar. 31, 2022

(51) Int. Cl.
*G06N 5/022* (2023.01)
*G06F 16/2455* (2019.01)
(Continued)

(52) U.S. Cl.
CPC ......... *G06N 5/022* (2013.01); *G06F 16/2456* (2019.01); *G06F 16/367* (2019.01);
(Continued)

(58) Field of Classification Search
CPC ..... G06N 5/022; G06F 16/906; G06F 16/367; G06F 16/2456; G06F 16/9024; G06F 18/22
See application file for complete search history.

(56) References Cited

U.S. PATENT DOCUMENTS

| 5,797,136 A | * | 8/1998 | Boyer | ............... | G06F 16/289 |
| | | | | | 707/999.005 |
| 6,397,204 B1 | * | 5/2002 | Liu | ............... | G06F 16/24544 |

(Continued)

FOREIGN PATENT DOCUMENTS

| CA | 3126470 A1 | * | 8/2020 | ....... G06F 16/24578 |
| CN | 102081602 A | * | 6/2011 | ......... G06F 17/2735 |

(Continued)

OTHER PUBLICATIONS

Chiara Campagnola, "An Introduction to knowledge Graphs," https://towardsdatascience.com/an-introduction-to-knowledge-graphs-841bbc0e796e, Towards Data Science, downloaded Sep. 24, 2020, 19 pages.

(Continued)

*Primary Examiner* — Shahid K Khan
(74) *Attorney, Agent, or Firm* — Klarquist Sparkman, LLP

(57) ABSTRACT

An intelligent labeling method is disclosed herein. The method can receive a plurality of input instances and access a knowledge graph comprising a plurality of nodes and a plurality of edges connecting the plurality of nodes. The plurality of nodes represent objects and the edges represent relationship between the objects. For at least some selected input instances, the method can identify respective matching objects represented by corresponding nodes of the knowledge graph. A selected input instance shares a common label with the corresponding matching object. For identified matching objects, the method can identify a common class object represented by a corresponding node of the knowledge graph. A percentage of identified matching objects are descendants of the common class object, and the percentage is greater than a predefined threshold. The method can (Continued)

associate a label of the common class object with the plurality of input instances.

15 Claims, 15 Drawing Sheets

(51) Int. Cl.
  *G06F 16/36* (2019.01)
  *G06F 16/901* (2019.01)
  *G06F 16/906* (2019.01)
  *G06F 18/22* (2023.01)
(52) U.S. Cl.
  CPC ........ *G06F 16/9024* (2019.01); *G06F 16/906* (2019.01); *G06F 18/22* (2023.01)

(56) References Cited

U.S. PATENT DOCUMENTS

| | | | | |
|---|---|---|---|---|
| 9,864,795 | B1* | 1/2018 | Halevy | G06F 16/353 |
| 9,870,356 | B2* | 1/2018 | Hakkani-Tür | G06N 5/00 |
| 2003/0177000 | A1* | 9/2003 | Mao | G06F 40/289 |
| | | | | 707/E17.058 |
| 2004/0102201 | A1* | 5/2004 | Levin | G06F 40/58 |
| | | | | 455/466 |
| 2005/0044102 | A1* | 2/2005 | Gupta | G06F 16/283 |
| | | | | 707/999.102 |
| 2010/0174739 | A1* | 7/2010 | Mons | G06N 5/01 |
| | | | | 707/769 |
| 2011/0302151 | A1* | 12/2011 | Abadi | G06F 16/2456 |
| | | | | 707/E17.017 |
| 2014/0067842 | A1* | 3/2014 | Chen | G06F 16/367 |
| | | | | 707/758 |
| 2015/0039596 | A1* | 2/2015 | Stewart | G06F 16/24578 |
| | | | | 707/723 |
| 2015/0100582 | A1* | 4/2015 | Xi | G06F 16/7867 |
| | | | | 707/738 |
| 2015/0169527 | A1* | 6/2015 | Zheng | G06V 10/235 |
| | | | | 382/181 |
| 2015/0261846 | A1* | 9/2015 | Hall | G06N 5/02 |
| | | | | 707/738 |
| 2016/0371255 | A1* | 12/2016 | Desai | G06F 40/151 |
| 2017/0068903 | A1* | 3/2017 | Hakkani-Tur | G06N 20/00 |
| 2017/0124217 | A1* | 5/2017 | Hassanzadeh | G06F 16/9024 |
| 2017/0357653 | A1* | 12/2017 | Bicer | G06F 16/2365 |
| 2018/0039696 | A1* | 2/2018 | Zhai | G06F 16/9024 |
| 2018/0165610 | A1* | 6/2018 | Dumant | G06F 40/47 |
| 2019/0205402 | A1* | 7/2019 | Sernau | G06Q 50/01 |
| 2019/0236469 | A1* | 8/2019 | Canim | G06N 5/022 |
| 2019/0236848 | A1* | 8/2019 | Wallis | H04L 41/12 |
| 2019/0286656 | A1* | 9/2019 | Yerva | G06N 3/044 |
| 2019/0355465 | A1* | 11/2019 | Salehian | G06N 5/02 |
| 2020/0081899 | A1* | 3/2020 | Shapur | G06F 16/211 |
| 2020/0097491 | A1* | 3/2020 | Berthiaume | G06V 10/44 |
| 2020/0134092 | A1* | 4/2020 | Yanosy, Jr. | G06F 16/86 |
| 2020/0242349 | A1* | 7/2020 | Ferreira Moreno | |
| | | | | G06V 30/18171 |
| 2021/0109995 | A1* | 4/2021 | Mihindukulasooriya | |
| | | | | G06F 40/247 |
| 2021/0149893 | A1* | 5/2021 | Sehgal | G06N 5/022 |
| 2021/0326519 | A1* | 10/2021 | Lin | G06N 20/10 |
| 2022/0114215 | A1* | 4/2022 | Bekkerman | G06N 5/04 |
| 2022/0237185 | A1* | 7/2022 | Portisch | G06F 16/2465 |
| 2022/0269702 | A1* | 8/2022 | Portisch | G06F 16/24573 |
| 2023/0073312 | A1* | 3/2023 | Portisch | G06F 16/9024 |

FOREIGN PATENT DOCUMENTS

| | | | | |
|---|---|---|---|---|
| EP | 1645974 A1 * | 4/2006 | .......... | G06F 16/907 |
| EP | 3522078 A1 * | 8/2019 | ............ | G06F 16/35 |
| GB | 2390704 A * | 1/2004 | ........ | G06F 17/2745 |
| KR | 20120038000 A * | 4/2012 | | |
| WO | WO-2004097664 A2 * | 11/2004 | .......... | G06F 17/2785 |

OTHER PUBLICATIONS

Kenneth Fisher, https://sqlstudies.com/2018/01/22/whats-dbo/, What's dbo?, SQL Studies, downloaded Aug. 18, 2020, 7 pages.
Ontology, DBpedia, https://wiki.dbpedia.org/services-resources/ontology, downloaded Aug. 25, 2020, 3 pages.
https://en.wikipedia.org/wiki/Ontology_components, Wikipedia, "Ontology components" downloaded Aug. 17, 2020, 5 pages.

* cited by examiner

| CTRY | CCode |
|---|---|
| Germany | DE |
| United Kingdom | UK |
| France | FR |
| Italy | IT |
| Luxembourg | LU |
| Poland | PL |

Name Columns — 1220

SYSTEMS AND METHODS FOR INTELLIGENT LABELING OF INSTANCE DATA CLUSTERS BASED ON KNOWLEDGE GRAPH

BACKGROUND

Users often encounter sets or clusters of instance data that do not have meaningful or proper labels. For example, a database table may contain columns (or rows) of instance data that do not have corresponding column names (or row names). In another example, certain clustering algorithms may divide a large data set into multiple data clusters without associating proper names or labels to the respective data clusters. Without meaningful names or labels, such sets or clusters of instance data may be unintelligible to the users and may not be properly integrated with existing databases for data mining or other advanced analytics. Thus, there remains a need for an improved system and method for intelligent labeling of instance data clusters.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain embodiments of the disclosure concern a computer-implemented method including receiving a plurality of input instances and accessing a knowledge graph comprising a plurality of nodes and a plurality of edges connecting the plurality of nodes. The plurality of nodes can represent objects and the plurality of edges represent relationship between the objects. For at least some selected input instances, the method can identify respective matching objects represented by corresponding nodes of the knowledge graph. A selected input instance can share a common label with the corresponding matching object. For identified matching objects, the method can identify a common class object represented by a corresponding node of the knowledge graph. A percentage of identified matching objects can be descendants of the common class object, and the percentage can be greater than a predefined threshold. The method can further associate a label of the common class object with the plurality of input instances.

In certain embodiments, the plurality of input instances can include a column of data in a first database table. Associating a label of the common class object with the plurality of input instances can include assigning the label to the column of data in the first database table.

In certain embodiments, the method can further include executing a JOIN operation that combines the column of data in the first database table with a column of data in a second database table. The label assigned to the column of data in the first database table can be identical to a label of the column of data in the second database table.

In certain embodiments, the method can further include translating the label associated with the plurality of input instances to an equivalent label defined in an ontology dictionary. The ontology dictionary can map ontology of the knowledge graph to ontology of a data repository.

In certain embodiments, the method can further replace the label associated with the plurality of input instances to the equivalent label and add the plurality of input instances and the equivalent label to the data repository.

In certain embodiments, the common class object can be one of a plurality of common class objects. The method can further include ranking the plurality of common class objects and presenting labels of the plurality of common class objects in a ranked list.

In certain embodiments, ranking the plurality of common class objects can be based on number of edges connecting nodes representing the identified matching objects to a node representing a respective common class object or the percentage of identified matching objects that are descendants of the respective common class object.

In certain embodiments, the at least some selected input instances can be randomly sampled from the plurality of input instances.

In certain embodiments, identifying the common class object corresponding to the identified matching objects can include iteratively searching ancestor nodes. The ancestor nodes can be connected to nodes representing the identified matching objects by one or more edges.

In certain embodiments, the one or more edges connecting the ancestor nodes and the nodes representing the identified matching objects can be defined by a set of properties. The set of properties can include a type property and/or a subclass-of property.

Certain embodiments of the disclosure also concern a system including a cluster labeling engine in communication with a knowledge graph. The knowledge graph can include a plurality of nodes and a plurality of edges connecting the plurality of nodes. The plurality of nodes can represent objects and the plurality of edges can represent relationship between the objects. The cluster labeling engine can include a user interface configured to receive a plurality of input instances and access the knowledge graph. The system can also include an instance matching operator configured to, for at least some selected input instances, identify respective matching objects represented by corresponding nodes of the knowledge graph. A selected input instance can share a common label with the corresponding matching object. The system can also include a common class object finder configured to, for identified matching objects, identify a common class object represented by a corresponding node of the knowledge graph. A percentage of identified matching objects can be descendants of the common class object, and the percentage can be greater than a predefined threshold. The cluster labeling engine can be configured to associate a label of the common class object with the plurality of input instances.

In certain embodiments, the plurality of input instances can include a column of data in a first database table. The cluster labeling engine can be configured to assign the label to the column of data in the first database table. The system can be further configured to support a JOIN operation that combines the column of data in the first database table with a column of data in a second database table. The label assigned to the column of data in the first database table can be identical to a label of the column of data in the second database table.

In certain embodiments, the cluster labeling engine can include an ontology translator configured to translate the label associated with the plurality of input instances to an equivalent label defined in an ontology dictionary. The ontology dictionary can map ontology of the knowledge graph to ontology of a data repository.

In certain embodiments, the cluster labeling engine can be further configured to replace the label associated with the plurality of input instances to the equivalent label and add the plurality of input instances and the equivalent label to the data repository.

In certain embodiments, the common class object can be one of a plurality of common class objects. The cluster labeling engine can further include a ranking operator configured to rank the plurality of common class objects and present labels of the plurality of common class objects in a ranked list.

In certain embodiments, the ranking operator can be configured to rank the plurality of common class objects based on number of edges connecting nodes representing the identified matching objects to a node representing a respective common class object.

In certain embodiments, the ranking operator can be configured to rank the plurality of common class objects based on the percentage of identified matching objects that are descendants of a respective common class object.

In certain embodiments, the common class object finder can be configured to identify the common class object corresponding to the identified matching objects by iteratively searching ancestor nodes. The ancestor nodes can be connected to nodes representing the identified matching objects by one or more edges.

In certain embodiments, the one or more edges connecting the ancestor nodes and the nodes representing the identified matching objects can be defined by a set of properties. The set of properties can include a type property and/or a subclass-of property.

Certain embodiments of the disclosure further concern one or more computer-readable media having encoded thereon computer-executable instructions causing one or more processors to perform a method. The method can receive a plurality of input instances selected from a column of data in a database table and access a knowledge graph including a plurality of nodes and a plurality of edges connecting the plurality of nodes. The plurality of nodes can represent objects and the plurality of edges can represent relationship between the objects. For the plurality of input instances, the method can identify respective matching objects represented by corresponding nodes of the knowledge graph. An input instance can share a common label with the corresponding matching object. For identified matching objects, the method can identify a common class object represented by a corresponding node of the knowledge graph. A percentage of identified matching objects can be descendants of the common class object and the percentage can be greater than a predefined threshold. The method can assign a label of the common class object to the column of data in the database table and translate the label associated with the plurality of input instances to an equivalent label defined in an ontology dictionary. The ontology dictionary can map ontology of the knowledge graph to ontology of a data repository. The method can also replace the label assigned to the column of data in the database table to the equivalent label and add the column of data in the database table and the equivalent label to the data repository.

The foregoing and other objects, features, and advantages will become more apparent from the following detailed description, which proceeds with reference to the accompanying figures.

BRIEF DESCRIPTION OF THE DRAWINGS

FIG. 12 is an example graphical user interface showing two columns of instance data in a data table.

DETAILED DESCRIPTION

Example 1—Overview of Intelligent Labeling of Instance Data Clusters

In data analytics, users often encounter instance data clusters (also referred to "sets of instance data" or "data instances" hereinafter) that are either unlabeled (i.e., no names) or are associated with improper labels (i.e., improper names). Labels are improper if they do not convey meaningful concept (e.g., characterizing some common attributes or properties of the data instances) about the instance data clusters, or even if they convey meaningful concept, such labels are incompatible with ontology of existing databases so that the instance data clusters cannot be integrated with the existing databases.

In one example use case, an unlabeled instance data cluster may be obtained after running a machine learning clustering algorithm to an unknown dataset. A user (or data consumer) of the dataset may not be able to identify common characteristics (or common concepts) underlying the unlabeled instance data cluster. As a result, the user cannot identify the nature or interpret the meaning of the instance data cluster. Thus, such unlabeled instance data cluster may be meaningless to the user.

In another example use case, in enterprise analytics scenarios, sets of instance data often need to be imported into a global analytics application such as a data warehouse, a data lake, etc. If the labels corresponding to the sets of instance data are not compatible or consistent with predefined ontology of the data warehouse or data lake, such instance data sets will not be fully integrated and thus cannot be properly accessed by the global analytics application.

The technology described herein addresses the challenges noted above by utilizing knowledge graphs. Specifically, the technology described herein provides an innovative solution that can automatically and intelligently label instance data clusters based on knowledge graphs. The identified labels can represent hypernyms for the instance data clusters, thus allowing a user to build human-explainable artificial intelligence systems implementing various clustering algorithms, and to support efficient integration of new instance data clusters into existing data warehouse or data lake.

Figure 1:
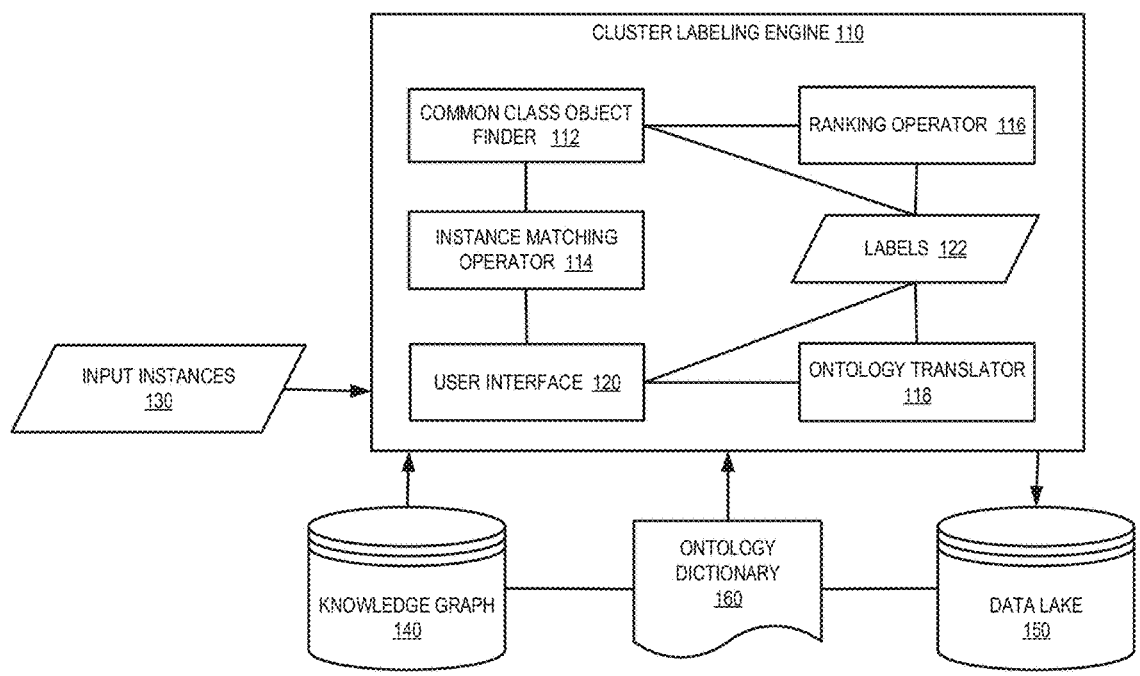
FIG. 1 is an overall block diagram of an example system including a cluster labeling engine that is configured to implement intelligent labeling of instance data clusters based on knowledge graph.

Example 2—Example Overview of the System for Intelligent Labeling of Instance Data Clusters FIG. 1 shows an overall block diagram of an example system 100 for automatic and intelligent labeling of instance data clusters.

The system 100 includes a cluster labeling engine 110, which includes a user interface 120, an instance matching operator 114, a common class object finder 112, a ranking operator 116, and an ontology translator 118. The user interface 120 is configured to receive input instances 130 that contain one or more instance data clusters that needs to be labelled. The cluster labeling engine 110 can also access a knowledge graph 140, which can be publicly available knowledge graphs (e.g., DBpedia, Wikidata, BabelNet, DBkWik, DBnary, etc.) or privately built knowledge graphs. The instance matching operator 114 and common class object finder 112 can implement specific operations of an intelligent labeling algorithm utilizing the knowledge graph 140, as described more fully below. Based on the knowledge graph 140, the cluster labeling engine 110 can generate labels 122 corresponding to the input instances 130. When multiple labels are generated for one instance data cluster, the ranking operator 116 can be called to rank the labels based on certain criteria. The cluster labeling engine 110 can present the labeling results corresponding to the input instances 130 in the user interface 120.

In certain embodiments, the knowledge graph 140 can be mapped to a data lake 150 (or date warehouse) through an ontology dictionary 160. By looking up the ontology dictionary 160, the ontology translator 118 can translate the labels 122 generated from the knowledge graph 140 to equivalent labels that are in conformity with the ontology of the data lake 150 (or data warehouse). The equivalent labels and the corresponding input instances can then be added to the data lake 150 (or data warehouse).

In practice, the systems shown herein, such as system 100, can vary in complexity, with additional functionality, more complex components, and the like. For example, there can be additional functionality within the cluster labeling engine 110. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the instance data clusters, labels, and the like can be stored in one or more computer-readable storage media or computer-readable storage devices. The technologies described herein can be generic to the specifics of operating systems or hardware and can be applied in any variety of environments to take advantage of the described features.

Example 3—Example Cloud-Based Intelligence Labeling of Instance Data Clusters

In certain embodiments, the cluster labeling engine can be implemented in a customer computer, for example, as a part of an on-premise enterprise resource planning software installed on a company's local computers or servers. In other embodiments, the cluster labeling engine can be implemented in a cloud which is hosted on a vendor's servers and can be accessed through a web browser.

Figure 2:
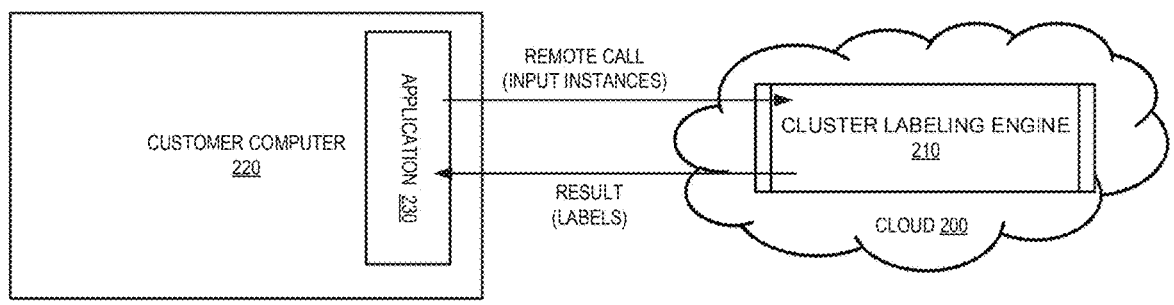
FIG. 2 is a block diagram illustrating a cloud-based cluster labeling engine in communication with a software application running on a customer computer.

For example, FIG. 2 shows a cluster labeling engine 210 located on a cloud 200. A customer computer 220 can run a software application 230, which includes an application programming interface (API) that can communicate with the cloud-based cluster labeling engine 210. Specifically, the application 230 can make remote calls and send input instances to the cluster labeling engine 210. Then the cluster labeling engine 210 can analyze the input instances based on knowledge graph as described more fully below. The results (e.g., the labels corresponding to the input instances) can be returned from the cluster labeling engine 210 to the application 230.

Figure 3:
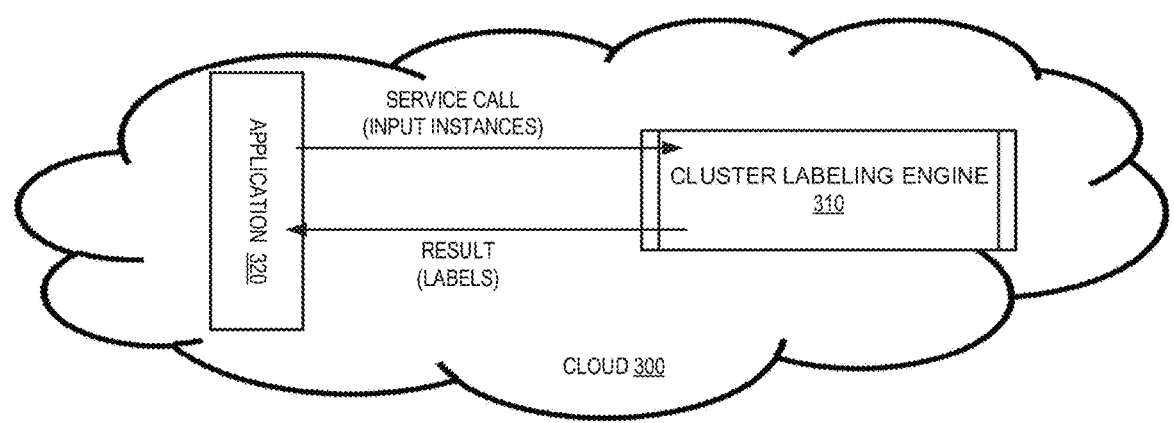
FIG. 3 is a block diagram illustrating a cloud-based cluster labeling engine integrated with a subscription-based software application running on the cloud.

In another example, the cluster labeling service can be run completely in the cloud and a customer can subscribe to such a service. As shown in FIG. 3, in such circumstances, both the cluster labeling engine 310 and the software application 320 that calls for service and receives results from the cluster labeling engine 310 can be run in the cloud 300.

Example 4—Example Knowledge Graph

As noted above and describe more fully below, the cluster labeling engine can generate labels for input instances based on analysis of knowledge graphs.

Generally, knowledge graph is a special type of database that maintains knowledge or information in a graph form. A typical knowledge graph includes a plurality of nodes representing objects (also being referred to "entities") and a plurality of edges connecting the nodes, wherein the edges represent relationship between the objects (e.g., is a parent of, is located in, etc.). One common type of knowledge graph is based on the resource description framework (RDF), which models statements of facts or web resources in expressions of the form subject—predicate—object, known as triples. For example, two nodes connected by an edge can describe a fact, which can be represented as (subject, predicate, object) triples.

Figure 4:
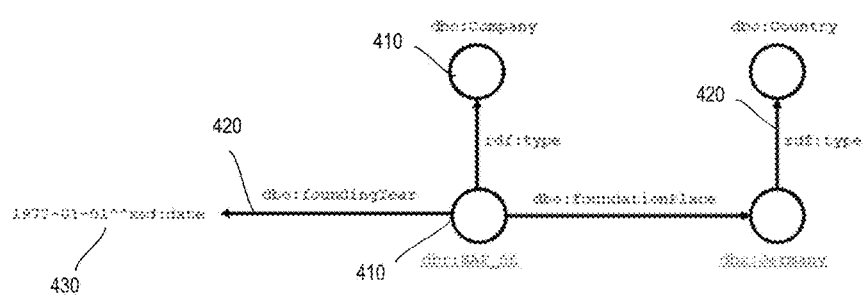
FIG. 4 is an example diagram illustrating nodes and edges of a knowledge graph.

As an example, FIG. 4 shows a portion of a knowledge graph 400 containing four nodes 410 respectively represent objects of "SAP_SE," "Germany," "Company," and "Country." A specific date value "1972-01-01" can also be deemed as a null node 430. The knowledge graph 400 also includes edges 420 with specific properties, such as "rdf:type," "dbo:foundationPlace," and "dbo:foundingYear," which represent relationships between the nodes 410. As shown, several facts can be obtained from this knowledge graph, such as (SAP_SE, is a type of, Company), (SAP_SE, has foundation place, Germany), (Germany, is a, Country), and (SAP_SE, has founding year, 1972-01-01).

In some knowledge graphs (e.g., RDF knowledge graphs), it is also possible to apply reasoning to the (subject, predicate, object) triples (e.g., rather than stating explicitly that "Germany" is a country as exemplified in FIG. 4). For example, according to a preconstructed reasoning rule, every object of "dbo:foundationPlace" is a country (by setting the property range). Thus, through reasoning, the triple (dbr:Germany, rdf:type, dbo:Country) can be "reasoned" or "materialized" into a statement of fact: "Germany is a country." Other reasoning rules can be similarly constructed. The technology described herein also applies to such reasoning-based knowledge graphs (e.g., the knowledge graph can be first "materialized" before performing the intelligent labeling algorithm described more fully below).

Typically, an object represented by a node contains an identifier (ID) and a label representing name of the object. The node can also have an associated uniform resource identifier (URI). The relationships represented by edges can be characterized by a set of edge properties that are specific to the knowledge graph.

Some of the nodes may represent more specific objects and can be deemed as instances contained in the knowledge graph. For example, "SAP_SE" can be an instance representing a specific company, and "Germany" can be an instance representing a specific country. Some of the nodes may represent more generic objects and can be deemed as class objects, the aggregation of which can define an ontology of the knowledge graph that contains the schema or common vocabulary of the knowledge graph. For example, "Company" is a class object that captures the common concept shared by many individual companies including "SAP_SE," and "Country" is a class object that captures the common concept shared by many individual countries including "Germany."

In certain embodiments, whether a specific node (e.g., "Germany") represents an instance object or a class object can depend on the underlying model or concept. According to one example embodiment, whether the term "Germany" belongs to an ontology or is an instance can be determined by checking the rdf:type property: If the type is owl:Class, then it belongs to the ontology; otherwise it is deemed an instance.

In certain embodiments, the nodes in a knowledge graph can be organized in a hierarchical structure where a lower-level node (representing a more specific object) may be connected to a higher-level node (representing a more generic object) by one or more edges. The lower-level node (or the lower-level object it represents) can be called a descendant of the higher-level node (or the higher-level object it represents), and the higher-level node (or the higher-level object it represents) can be called an ancestor of the lower level node (or the lower-level object it represents).

For a given knowledge graph, an ontology can be created by describing the class objects with a list of properties. For example, the DBpedia ontology currently covers over 600 class objects which form a subsumption hierarchy and are described by over 2,000 different edge properties.

Since knowledge graphs contain many real-world entities/objects/instances, they can be valuable sources for finding commonalities and generating meaningful labels for instance data clusters.

Figure 5:
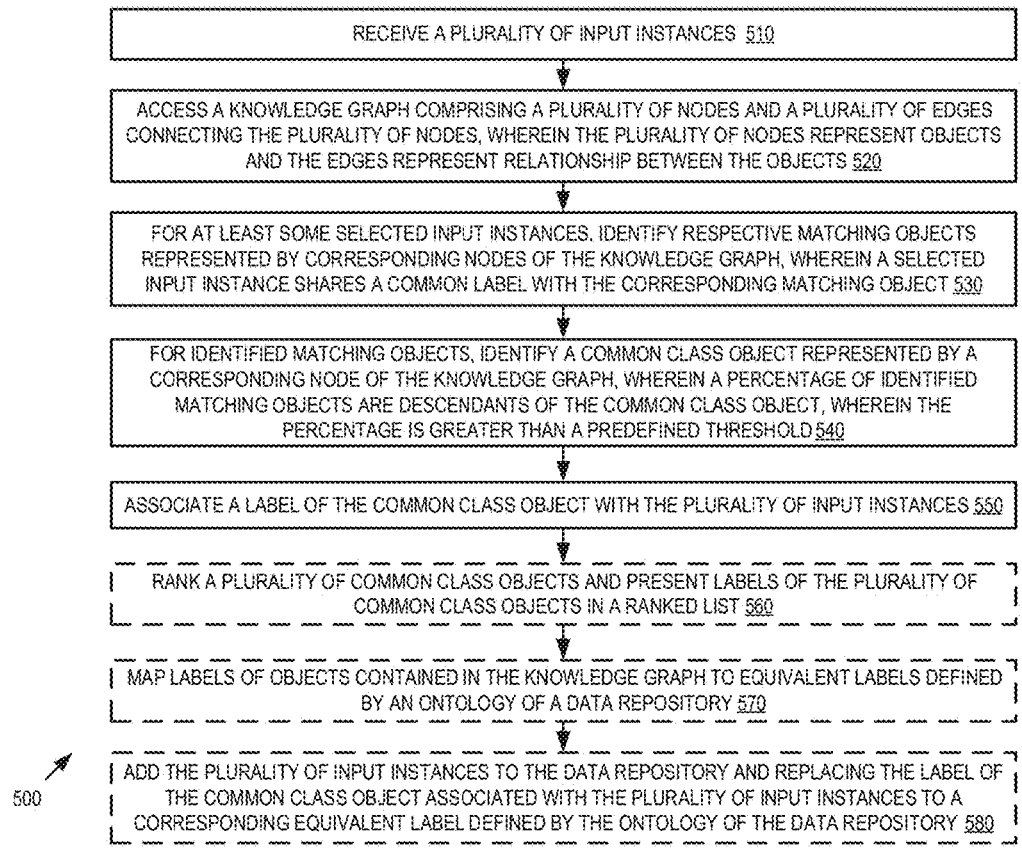
FIG. 5 is a flowchart illustrating an example overall method of intelligent labeling of instance data clusters based on knowledge graph.

Example 5—Example Overall Method Implementing Intelligent Labeling of Instance Data Clusters FIG. 5 is a flowchart 200 illustrating an example overall method implementing intelligent labeling of instance data clusters and can be performed, for example, by the system of FIG. 1.

At 510, the method receives a plurality of input instances that need to be labelled.

At 520, the method can access a knowledge graph, which can be a public and free knowledge graph or a private knowledge graph. As described above, the knowledge graph can include a plurality of nodes and a plurality edges connecting the plurality of nodes. The plurality of nodes represent objects and the plurality of edges represent relationship between the objects.

At 530, for at least some selected input instances, the method can identify respective matching objects represented by corresponding nodes of the knowledge graph. As described herein, a selected input instance shares a common label with the corresponding matching object.

At 540, for identified matching objects, the method can identify a common class object represented by a corresponding node of the knowledge graph. As described herein, a percentage of identified matching objects are descendants of the common class object, and the percentage is greater than a predefined threshold.

At 550, the method can associate a label of the common class object with the plurality of input instances.

In certain embodiments, one or more optional steps can be performed.

For example, in certain circumstances, the method can identify a plurality of common class objects corresponding to the selected input instances. Thus, at 560, the method can rank the plurality of common class objects and present labels of the plurality of common class objects in a ranked list.

In another example, a data repository (e.g., a data lake or a date warehouse) may have a predefined ontology. At 570, the method can map labels of objects contained in the knowledge graph to equivalent labels defined by the ontology of the data repository. Then at 580, the method can add the plurality of input instances to the data repository and replace the label of the common class object associated with the plurality of input instances to a corresponding equivalent label defined by the ontology of the data repository.

The method shown in FIG. 5 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example 6—Example Algorithm Overview

A theoretical overview of the intelligent labeling algorithm implemented by the cluster labeling engine can be summarized below.

Denote K a knowledge graph, $P_K$ a set of edge properties used by K and $C_K$ a set of class nodes included in K. In addition, denote $I_K$ a set of instances which are contained in the knowledge graph K, $P_C$ a subset of $P_K$ so that $P_C \subseteq P_K$. Further denote $I_L$ a set of input instances for which a label needs to be found.

Denote match($I_L$, K) an operator that projects members from a given set of input instances $I_L$ to members from $I_K$ where $i_L \equiv i_K$ and $(i_L \subseteq I_L) \wedge (i_K \subseteq (I_K \cup P_K \cup C_K))$. As described herein, the objects represented by $I_K$ that match the input instances are also referred to matching objects, wherein an input instance shares a common label with the corresponding matching object. In an example embodiment, the match ($I_L$, K) operator can be implemented by the instance matching operator 114 depicted in FIG. 1.

Further denote common($I_L$, K, Φ) an operator which finds a set of common class objects $C_{CK}$ where $C_{CK} \subseteq C_K$ given a set of input instances $I_L$, a knowledge graph K to be used, and a set of configuration parameters Φ. Thus, nodes representing all matching objects can be connected to a node representing a common class object by one or more edges. In other words, all matching objects can be related to the common class object through properties characterized by the edges connecting the respective nodes. Thus, the common class object represents a common concept of the matching objects, and the label of the common class object can represent a hypernym for the labels of matching objects. In an example embodiment, the common($I_L$, K, Φ) operator can be implemented by the common class object finder 112 depicted in FIG. 1.

Given $I_L$, K, and $P_C$, the intelligent labeling algorithm can include two steps:
(1) Identify matching objects $I_M$ corresponding to the input instances $I_L$: $I_M$=match($I_L$, K) where $I_M \subseteq K$.
(2) Identify common class objects $C_{CK}$ in K as defined by predicates $p_c \in P_C$ given $I_M$.

An example Java implementation of the above two steps is illustrated in the table below:

```
// Step 1: Link the concepts into the knowledge source
ArrayList<String> links = getConceptLinks(clusterMemberTerms);
```

```
// Step 2: Determine common hypernym
HashSet<String> closestConcepts = determineClosestCommonHypernym
(links, limitOfHops);
```

Example 7—Example Method of Identifying Matching Objects in a Knowledge Graph

In one example embodiment, the matching operation denoted by match operator can be implemented by a simple string comparison or string matching. Due to the vast number of instances in typical knowledge graphs and the multitude of labels provided (e.g., there are about 20 labels for "France" in Wikidata), string matching can be a simple option with a relatively high probability of finding a matching object. In certain embodiments, wildcards (e.g., '*', '%', etc.) can be used in string matching. In certain embodiments, the matching operation can be based on unicode characters such as emojis as illustrated below. Other more advanced matching techniques can also be utilized.

An example Java implementation of the matching operation (based on string matching) is illustrated in the table below:

```
/**
 * Links the given concepts in to the knowledge graph.
 * @param conceptsToBeLinked An array of concepts that shall be linked.
 * @return A list of links that were found for the given concepts. Concepts that could not be
linked are ignored.
 * If none of the given concepts can be linked, the resulting ArrayList will be empty.
 */
public static ArrayList<String> getConceptLinks(String[ ] conceptsToBeLinked){
    // result data structure
    ArrayList<String> result = new ArrayList<>( );
    // linking mechanism
    LabelToConceptLinker linker = knowledgeGraph.getLinker( );
    // link each of the given labels in variable 'result'
    for(String label : conceptsToBeLinked) {
        String link = linker.linkToSingleConcept(label);
        if(link == null) {
            System.out.println("Concept '" + label + "' could not be linked into the given
knowledge graph.");
        } else {
            result.add(link);
            System.out.println("Concept'" + label + "' was linked to: " + link);
        }
    }
    return result;
}
```

Thus, for a set of input instances, the matching operation can identify respective matching objects represented by corresponding nodes (also referred to "matching nodes") of the knowledge graph. As noted above, an input instance shares a common label with the corresponding matching object.

For example, let the input instances include three string members {"Germany," "France," "Italy" } and the knowledge database is Wikidata. After running the matching operation illustrated by the Java code above, three matching nodes representing respective matching objects with the following URIs in Wikidata can be obtained:
https://www.wikidata.org/wiki/Q183
https://www.wikidata.org/wiki/Q142
https://www.wikidata.org/wiki/Q38

The first URI corresponds to a matching node representing the matching object Germany (ID=Q183), the second URI corresponds to a matching node representing the matching object France (ID=Q142), and the third URI corresponds to a matching node representing the matching object Italy (ID=Q38).

In certain embodiments, the intelligent labeling algorithm described herein can generate a label for the input instances even if the matching operation could not identify corresponding matching objects for some of the input instances. As described herein, the ratio between the number of input instances that have corresponding matching objects and the total number of input instances is termed "matching coverage." Thus, if matching objects can be identified for all input instances, the matching coverage is 100%. On the other hand, if matching objects cannot be identified for some of the input instances, the matching coverage is less than 100%. The intelligent labeling algorithm described herein can generate a meaningful label even if the matching coverage is greater than a predefined matching coverage ratio, which can be as low as 50%.

For example, assume that the input instances include the following four emojis {"," "," "," ""}, each of which has corresponding unicode characters. Running the matching operation illustrated above using Wikidata, no matching object is found for the first two emojis (i.e., the flags representing Germany and France). However, the matching operation links the remaining two emojis to respective matching objects in Wikidata: #ML__en and #ML__en. Thus, the matching coverage is only 50% in this example. However, after running the common operator described below, the intelligent labeling algorithm can still identify a proper label "sovereign state" for the full set of input instances including the four emojis.

Because the intelligent labeling algorithm described herein does not require 100% matching coverage, in certain embodiments, the matching operation can be run on only selected input instances. For example, when the full set of input instances has a large number of members (e.g., several hundreds or thousands input instances), for computational efficiency, the algorithm only needs to identify the matching objects for a selected subset of the input instances, based on which the common class objects can be found and proper labels can be obtained. The subset of the input instance can be selected in a variety of ways. In one example embodiment, the subset of input instances can be selected based on a predefined sampling sequence (e.g., select every odd or even member in the full set of input instances). In another example embodiment, the subset of input instances can be randomly selected from the full set of input instances. The sampling ratio (i.e., the ratio between the number of input instances in the selected subset to the number of input instances in the full set) can be predefined by a user.

Example 8—Example Method of Identifying Common Class Objects in a Knowledge Graph After identifying matching objects corresponding to selected input instances, the intelligent labeling algorithm can apply the common operator to identify a common class object represented by a corresponding node in the knowledge graph. As described herein, the label of the identified common class object can be associated with the input instances. An example Java implementation of the common operator is illustrated in the table below.

```
/**
 * Determine the closest common hyperconcept.
 * @param links The linked concepts for which the closest common hyperconcept shall be found.
 * @return The closest common hypernym. If multiple candidates apply, all are returned. If there
is no closest common hypernym. the list will be empty.
 */
    public static HashSet<String> determineClosestCommonHypernym(ArrayList<String> links,
int limitOfHops){
        // The links for the next iteration, i.e. the concepts whose hyperconcepts will be looked for in
the next iteration.
        HashMap<String, HashSet<String>> linksForNextIteration = new HashMap<>( );
        // All hyperconcepts
        HashMap<String, HashSet<String>> allHyperconcepts = new HashMap<>( );
        iterativeBroadeningLoop:
        for(int currentHops = 0; currentHops < limitOfHops; currentHops++){
            // Simple logging
            System.out.println("\n\nIteration " + (currentHops + 1));
            for(String link : links){
                HashSet<String> nextNextIteration = new HashSet<>( );
                if(!linksForNextIteration.containsKey(link)){
                    // there is no next lookup defined -> use root link
                    nextNextIteration = (knowledgeGraph.getHypernyms(link));
                    // set links for next iteration
                    linksForNextIteration.put(link, nextNextIteration);
                    // set links all hyperconcepts
                    addOrPut(allHyperconcepts, link, nextNextIteration);
                    // simple logging
                    if(nextNextIteration != null && nextNextIteration.size( ) > 0) {
                        System.out.println("\nHyperconcepts for " + link);
                        for (String s : nextNextIteration) {
                            System.out.println("\t" + s);
                        }
                    }
                } else {
                    // the next lookup iteration has been defined
                    for(String nextConcept: linksForNextIteration.get(link)){
                        nextNextIteration.addAll(knowledgeGraph.getHypernyms(nextConcept));
                    }
                    // set links for next iteration
                    linksForNextIteration.put(link, nextNextIteration);
                    // set links all hyperconcepts
                    addOrPut(allHyperconcepts, link, nextNextIteration);
```

```
            // simple logging
            if(nextNextIteration != null && nextNextIteration.size( ) > 0) {
                System.out.println("\nNew Hyperconcepts for " + link);
                // logging
                for (String s : nextNextIteration) {
                    System.out.println("\t" + s);
                }
            }
        }
    }
    // check whether a common hyperconcept has been found
    HashSet<String> commonConcepts = determineCommonConcepts(allHyperconcepts);
    if(commonConcepts.size( ) > 0){
        return commonConcepts;
    }
}
// nothing found, return an empty set
return new HashSet<>( );
}
```

As noted above, a common class object can be related to all matching objects through properties characterized by the edges connecting the respective nodes. Thus, to identify a common class object associated with the matching objects, the intelligent labeling algorithm can search the ancestor nodes of each matching node representing an identified matching object, and determine if all matching nodes representing the identified matching objects are linked to at least one common ancestor node. If so, then the object represented by the common ancestor node can be identified as a common class object.

Example 9—Example Properties Defined by Edges

As described herein, an ancestor node representing a common class object is connected to a matching node representing an identified matching object by one or more edges characterized by certain predefined properties. In some embodiments, the set of predefined properties used by the intelligent labeling algorithm can be manually configured.

In an example embodiment, when the knowledge graph is Wikidata, the predefined properties can include the "instance of" (P31) property and the "subclass of" (P279) property, which are respectively defined in the following URIs:
   https://www.wikidata.org/wiki/Property:P31
   https://www.wikidata.org/wiki/Property:P279

Figure 6:
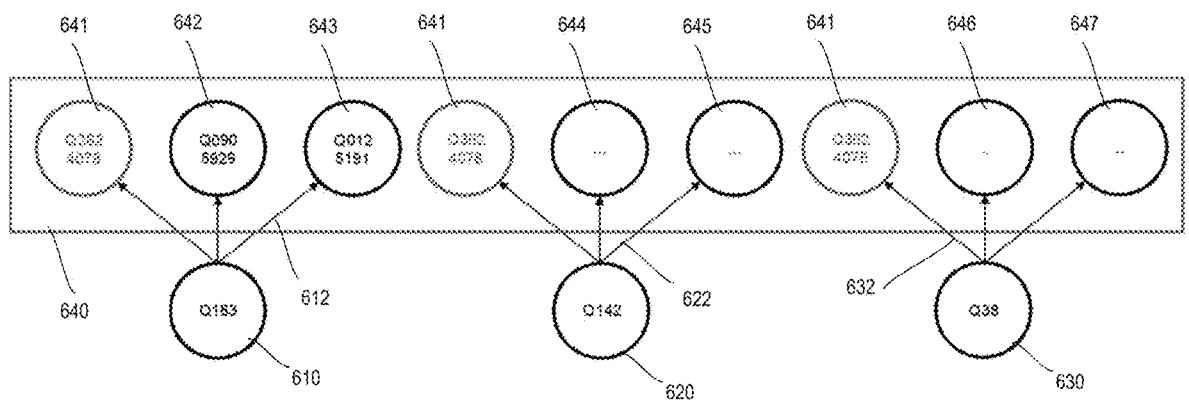
FIG. 6 is an example diagram illustrating the concept of identifying a common class object based on identified matching objects in a knowledge graph.

In another example embodiment, the predefined properties can include the "type" and "subClassOf" properties, which are used in ontologies of many knowledge graphs that adopt the W3C standard and are respectively defined in the following URIs:
   http://www.w3.org/1999/02/22-rdf-syntax-ns#type
   http://www.w3.org/1999/02/22-rdf-syntax-ns#subclassOf Example 10—Example Method of Searching a Common Ancestor Node in a Knowledge Graph As one illustrative example, FIG. 6 shows three matching nodes 610 (ID=Q183), 620 (ID=Q142), and 630 (ID=Q38), which respectively represent three matching objects corresponding to three input instances {"Germany," "France," "Italy"}, as described above. A group of ancestor nodes (e.g., 641, 642 and 643) are connected to the matching node 610 by one edge 612. Similarly, a group of ancestor nodes (e.g., 641, 644 and 645) are connected to the matching node 620 by one edge 622, and a group of ancestor nodes (e.g., 641, 646 and 647) are connected to the matching node 630 by one edge 632. Each of the edges 612, 622 and 632 can be characterized by either "instance of" or "subclass of" property, as noted above. After running the common operator illustrated by the Java code above, the intelligent labeling algorithm can find that node 641 (ID=Q3624078) is a common ancestor for matching nodes 610, 620 and 630. Thus, the object represented by node 641 can be identified as a common class object, which has a label "sovereign state." Accordingly, the label of the common class object, i.e., "sovereign state," can be associated with the three input instances {"Germany," "France," "Italy"} in this example.

In the embodiment depicted in FIG. 6, each of the matching nodes 610, 620 and 630 is directly connected to the common ancestor node 641 by one edge, and the search space 640 can be limited to nodes (e.g., 641-647) that are located in one layer above the matching nodes in the knowledge graph hierarchy.

In other embodiments, matching nodes representing matching objects may be connected to a common ancestor node representing a common class object by more than one edge. In some embodiments, the number of edges connecting multiple matching nodes to their common ancestor node may be different (e.g., one matching node may be connected to the common ancestor node by one edge, whereas another matching node may be connected to the common ancestor node by more than one edges).

Figure 7:
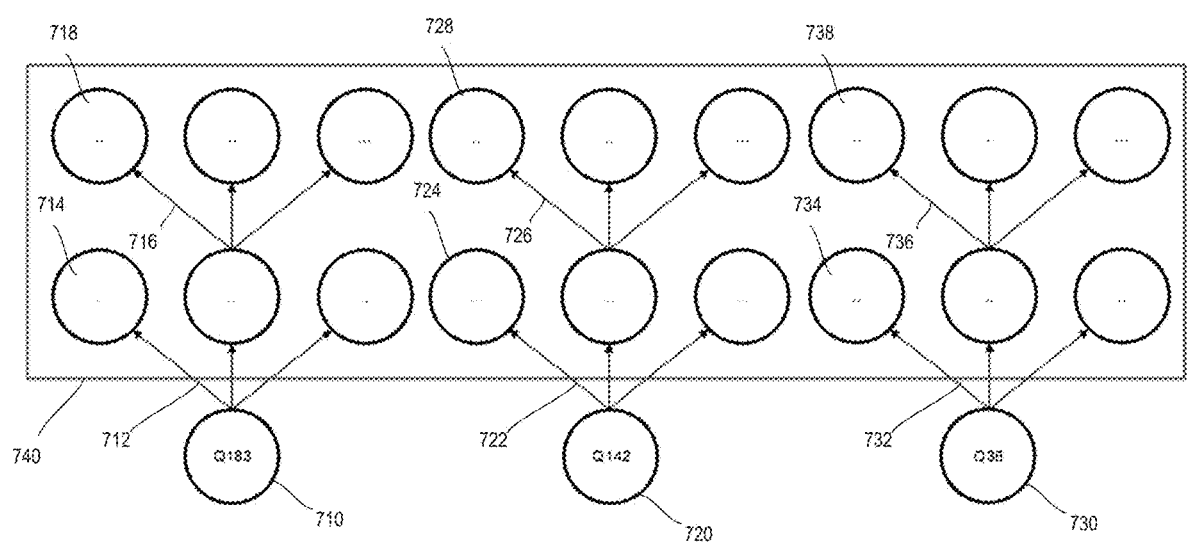
FIG. 7 is an example diagram illustrating the concept of iteratively searching to identify common class objects based on identified matching objects in a knowledge graph.

For example, as illustrated in FIG. 7, a first layer of ancestor nodes (e.g., 714, 724, 734) can be connected to corresponding matching nodes (e.g., 710, 720, 730) by respective first edges (e.g., 712, 722, 732), and a second layer of ancestor nodes (e.g., 718, 728, 738) can be connected to the first layer of ancestor node nodes (e.g., 714, 724, 734) by respective second edges (e.g., 716, 726, 736). As noted above, each edge (e.g., 712, 722, 732, 716, 726, 736) can be characterized by one of the predefined properties. Additional layers of ancestor nodes with respective connecting edges can be included in a similar manner. To search for common class objects corresponding to the identified matching objects, the intelligent searching algorithm can iteratively search ancestor nodes of the matching nodes, wherein the ancestor nodes can be connected to the matching nodes by one or more edges. In other words, the search space (e.g., 740) of the common operator can include multiple layers of ancestor nodes. In one embodiment, the iteration can continue until at least one common class object is found or return null if no common class object is found after searching all ancestor nodes. In another embodiment, certain stopping criteria can be applied, e.g. by limiting the maximal number of iterations.

In the embodiments described above, all identified matching objects are descendants of one common class object (i.e., all matching nodes are directly or indirectly connected to one common ancestor node). Yet in one particular embodiment, the intelligent labeling algorithm described herein does not require all identified matching objects to be descendants of one common class object (i.e., at least some of the matching nodes are not connected to one common ancestor node). For example, assume the intelligent labeling algorithm has identified N matching objects, but only M matching objects are found to be descendants of a class object O, wherein N are M are integers and M<N. As described herein, the intelligent labeling algorithm can identify the class object O as a common class object for all N matching objects if the ratio M/N is greater than a predefined commonality threshold (e.g., 50%, 60%, 70%, 75%, 80%, 85%, 90%, 95%, etc.). In other words, as long as a predefined portion (or majority) of the matching objects are descendants of a class object, such class object can be identified as a common class object for all matching objects.

Example 11—Example Method of Ranking Common Class Objects Corresponding to Input Instances In certain embodiments, the identified matching objects corresponding to the input incidents can have a plurality of common class objects. Each common class object has a label which can be associated with the input instances. As described herein, the intelligent labeling algorithm can rank these common class objects based on one or more predefined criteria. The labels of these common class objects can be presented to the user in a ranked list based on the ranking of the common class objects.

For example, based on Wikidata, 27 ancestor nodes can be found for the matching node representing the matching object Germany (ID=Q183), 45 ancestor nodes can be found for the matching node representing the matching object France (ID=Q142), and 28 ancestor nodes can be found for the matching node representing the matching object Italy (ID=Q38). Running the common operator illustrated above, the intelligent labeling algorithm can identify four common class objects respectively represented by four common ancestor nodes with the following URIs:

http://www.wikidata.org/entity/Q3024240
http://www.wikidata.org/entity/Q13442814
http://www.wikidata.org/entity/Q3624078
http://www.wikidata.org/entity/Q2631496

The labels associated with these four common class objects are "historical country," "scientific article," "sovereign state," and "constituency of the European Parliament." As noted above, these four common class objects can be ranked and their labels can be presented to the user in a ranked list.

In certain embodiments, the plurality of common class objects can be ranked based on the number of edges connecting the matching nodes representing the identified matching objects to the common ancestor node representing the respective common class object. When the number of edges connecting the matching nodes to a common ancestor node increases, the common class object represented by the common ancestor node becomes more generic to the matching objects. Thus, a common class objects associated with a smaller number of interconnecting edges can be ranked higher on the list.

The number of edges (NE) used for the ranking can be defined in a variety of means. For example, assuming M matching objects {O(i)} (where i=1 ... M) are connected to a common class object C, and the number of edges connecting O($i$) to C is denoted as E(i). In one embodiment, the ranking can be based on total edge count, i.e., NE=sum(E(i)) for i=1 ... M. Applying this ranking criterion to the example described above, among the four common class objects, the one with the label "sovereign state" is ranked at the top of the list and the one with the label "scientific article" is ranked at the bottom of the list. In another embodiment, the ranking can be based on the minimum edge count, i.e., NE=min(E(i)) for i=1 ... M. In yet another embodiment, the ranking can be based on the median edge count, i.e., NE=min(E(i)) for i=1 ... M.

In certain embodiments, the plurality of common class objects can be ranked based on the percentage of identified matching objects that are descendants of the respective common class object. As noted above, the intelligent labeling algorithm described herein allows not all identified matching objects to be descendants of a common class object. Thus, if there are a plurality of common class objects are identified for a group of matching objects, a common class objects having more descendants can be ranked higher in the list because it suggests more matching objects share the common concept of the common class object.

In yet another embodiment, the plurality of common class objects can be ranked based on their compatibility with a predefined ontology. Specifically, labels of the common class objects can be compared with labels contained in the predefined ontology. A common class object having a matching label (i.e., the label of the common class object matches a corresponding label in the predefined ontology) can be ranked higher in the list.

Other criteria can also be used for ranking the common class objects. In certain embodiments, different ranking criteria can be combined to rank the common class objects.

Example 12—Example Method of Applying Constraint Parameters in Identifying Common Class Objects As noted above, the common operator can have a set of configuration parameters Φ, which can allow a user to customize the intelligent labeling process. Specifically, the user can use Φ to specify one or more constraint parameters that control the process of searching for common class objects corresponding to identified matching objects in a knowledge graph. In one embodiment, the user can specify one or more constraint parameters specifying early stopping criteria, e.g., limiting the maximal number of iterations, limiting the maximum number of common class objects to be identified, etc. In another embodiment, the user can specify one or more parameters that instruct the common operator to ignore certain classes or instances (e.g., disambiguation pages) in the knowledge graph so as to limit the scope of search. In yet another embodiment, the user can use Φ to specify some predefined algorithm parameters, such as commonality threshold, matching coverage ratio, ranking criteria for common class objects, etc., as described above.

Example 13—Example Method of Data Import into a Data Repository Based on Ontology Mapping The technology described herein can be particularly helpful for importing a database table to a data repository (such as a data lake or a data warehouse) having its own, proprietary ontology, and ensure that labels of the database table is in compliance with the ontology of the data repository.

As described herein, a knowledge graph can have its own ontology, which can be defined from class objects (including their labels) contained in the knowledge graph. An ontology dictionary can be created through ontology mapping that links labels of objects defined in the ontology of the knowledge graph to corresponding equivalent labels defined in the ontology of the data repository. Such ontology mapping can be performed manually or assisted by a computer software running semantic analysis.

As described above, data stored in the database table can be associated with labels obtained from common class objects contained from the knowledge graph. Some of the labels defined in the ontology dictionary can be translated into equivalent labels that are compliant with the ontology of the data repository. The translated labels together with the associated data in the database table can then be imported into the repository.

Figure 8:
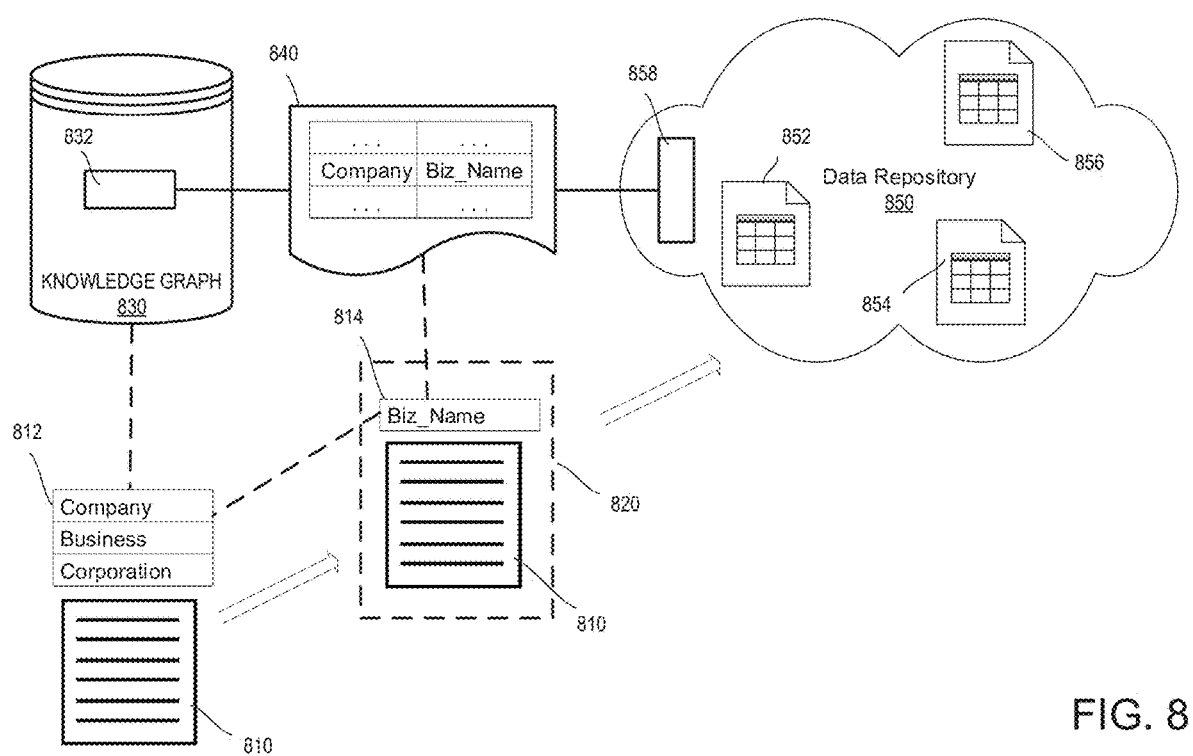
FIG. 8 is an example diagram illustrating importing a database table to a data repository in compliance with a predefined ontology.

FIG. 8 shows a diagram illustrating an example method of importing a database table 810 into a data repository 850, which can be a data lake or a data warehouse.

As shown, the data repository 850 includes a plurality of database tables (e.g., 852, 854, 856). The data repository 850 also maintains its own ontology 858 and all database tables contains therein are compliant with the ontology 858 so that a software application accessing the data repository can properly utilize the database tables. Otherwise, if database tables in the data repository 850 are not compliant with the ontology 858 (for exampling, assuming database tables 852, 854, 856 have different naming conventions), then some database operations (e.g., a data JOIN statement) may not be able to access all relevant data because of inconsistent use of data labels among the database tables.

As shown, an ontology dictionary 840 can be created that maps the ontology 832 of a knowledge graph 830 to the ontology 858 of the data repository 850. The ontology dictionary 840 can contain a table that maps some labels (e.g., "Company") defined in the ontology 832 of the knowledge graph 830 to equivalent labels (e.g., "Biz_Name") defined in the ontology 858 of the data repository 850.

Running the intelligent labeling algorithm described above, data instances contained in the database table 810 can be associated one or more labels 812 (e.g., "Company," "Business," and "Corporation") derived from the knowledge graph 830 (these labels can be presented in a ranked list, as noted above).

However, the labels 812, which are compliant with the ontology 832, may not be compliant with the ontology 858 of the data repository 850. To ensure ontology compliance when importing the database table 810 into the data repository 850, the labels 812 can be compared with labels contained in the ontology dictionary 840. As shown in this example, by looking up the ontology dictionary 840, it can be found that the label "Company" defined in ontology 832 has an equivalent label "Biz_Name" defined in ontology 858, whereas the two other labels "Business" and "Corporation" have no corresponding equivalent labels and can be removed. Thus, the labels 812 can be replaced with the equivalent label 814 (e.g., "Biz_Name"). Translation from the data labels 812 to equivalent labels 814 can be implemented by the ontology translator 118 depicted in FIG. 1. The database table 810, together with the equivalent label 814, can then be imported into the data repository 850. Because the equivalent label 814 is compliant with the ontology 858, the data instances contained in the database table 810 can be properly used by software application accessing the data repository 850.

Example 14—Example Use Case for Intelligent Labeling of Data Clusters

Figure 9:
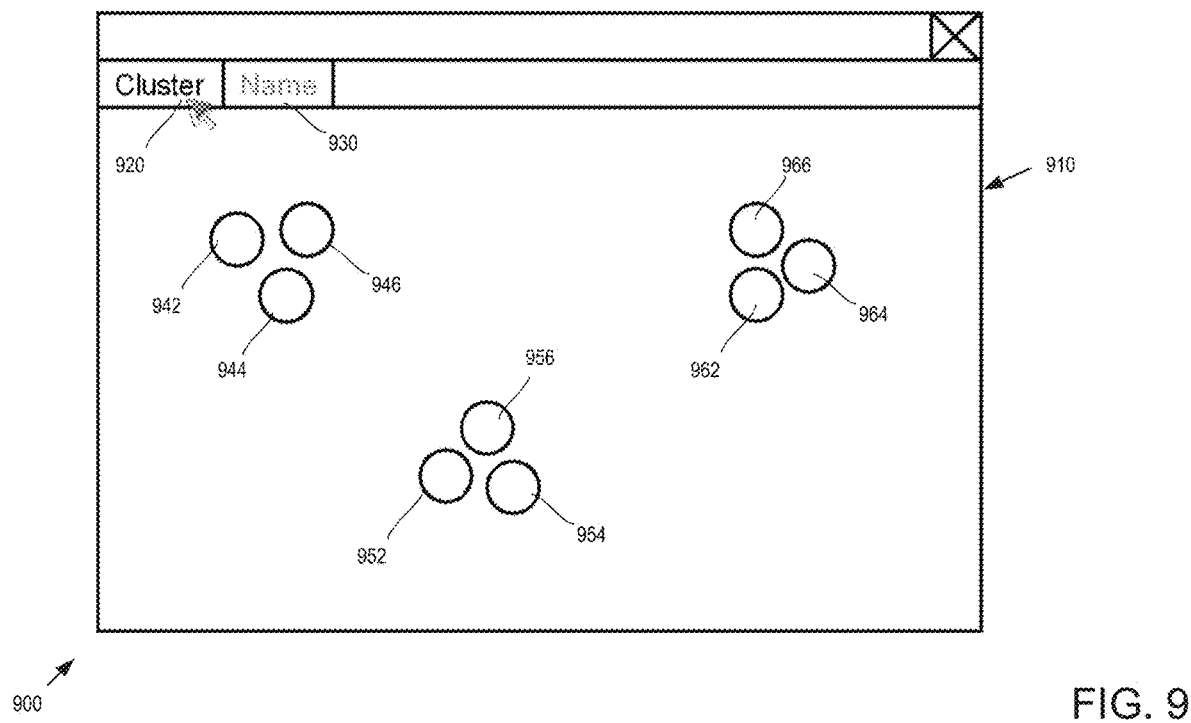
FIG. 9 is an example graphical user interface showing a set of input instance data.
Figure 10:
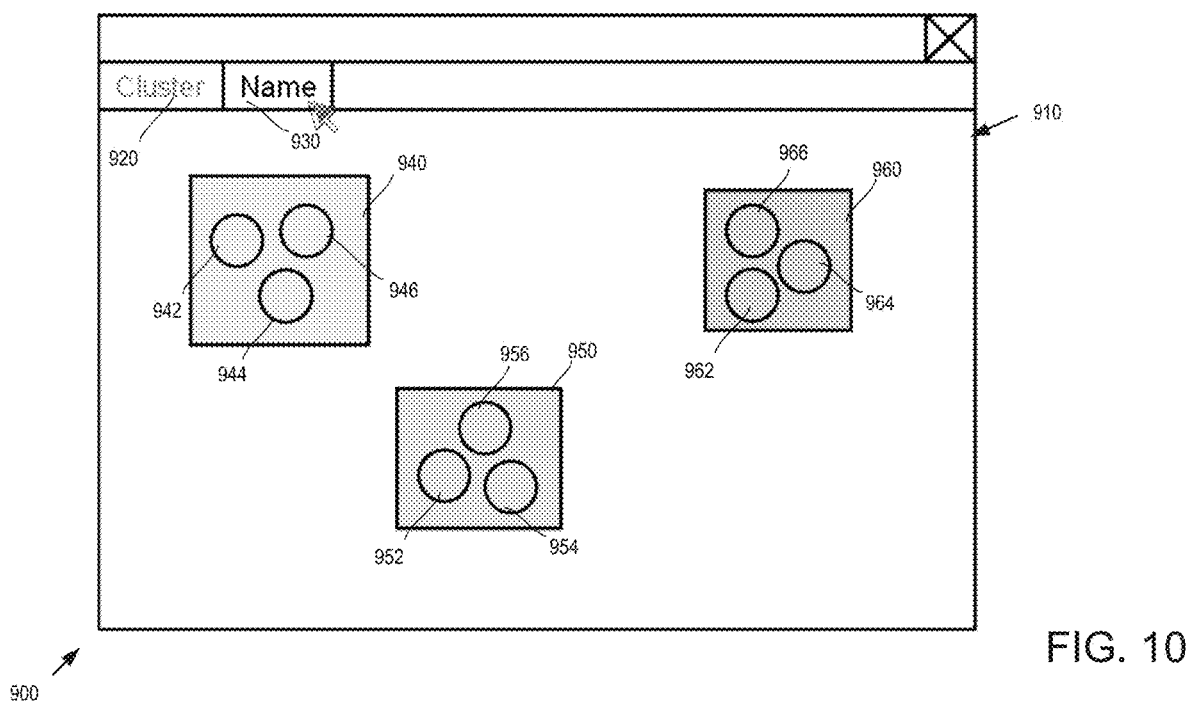
FIG. 10 is an example graphical user interface showing results of instance data clusters after applying a clustering algorithm to the set of input instance data depicted in FIG. 9.
Figure 11:
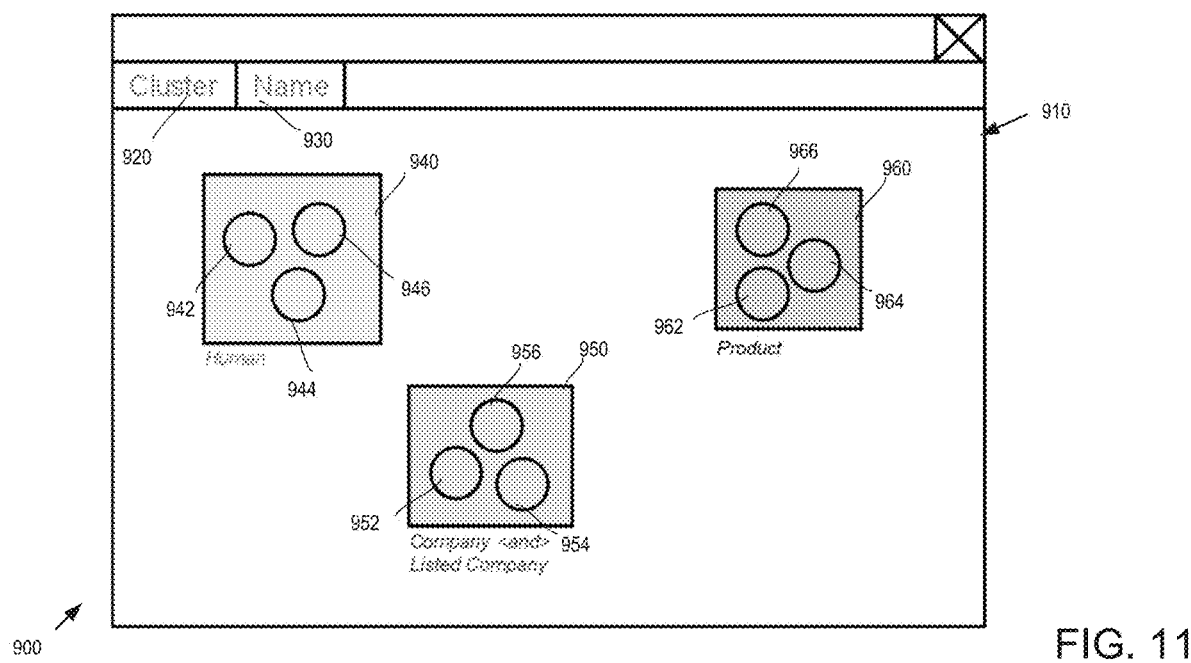
FIG. 11 is an example graphical user interface showing results of intelligent labeling for the instance data clusters depicted in FIG. 10.

FIGS. 9-11 show an example graphical user interface 900 illustrating application of the technology described herein for intelligent labeling of data clusters.

As shown in FIG. 9, the graphical user interface 900 includes a window 910 displaying a set of data instances (e.g., 942, 944, 946, 952, 954, 956, 962, 964, 966). A user can enter a command, e.g., by clicking a "Cluster" button 920, to initiate a clustering function that implements a data clustering algorithm. As shown in FIG. 10, the clustering function can cluster the full set of data instances into three subsets 940 (containing data instances 942, 944, and 946), 950 (containing data instances 952, 954, and 956), and 960 (containing data instances 962, 964, and 966). The user can then enter another command, e.g., by clicking a "Name" button 930, to make a call to the cluster labeling engine that implements the intelligent labeling algorithm described above. As shown in FIG. 11, the resulting labels associated with the three subsets can be displayed next thereto. For example, one label "Human" is associated with the three data instances contained in subset 940, two labels "Company" and "Listed Company" are associated with the three data instances contained in subset 950, and one label "Product" is associated with the three data instances contained in subset 960.

Example 15—Example Use Case for Intelligent Labeling of Columns in a Data Table

Figure 13:
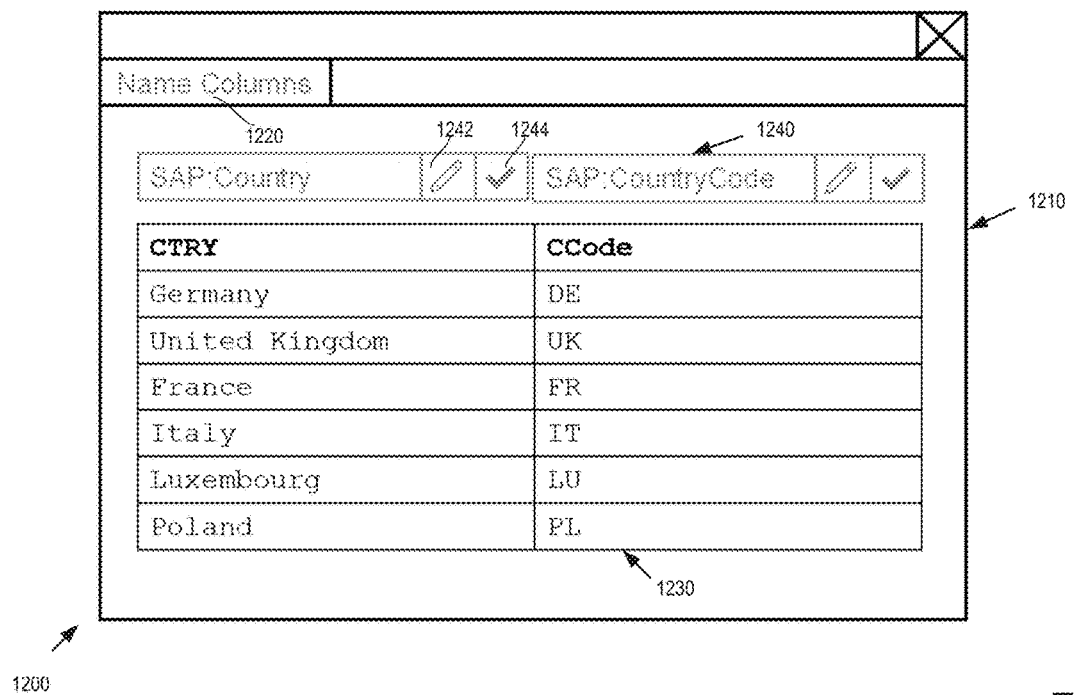
FIG. 13 is an example graphical user interface showing results of intelligent labeling for the two columns of instance data depicted in FIG. 12.

FIGS. 12-13 show an example graphical user interface 1200 illustrating application of the technology described herein for intelligent labeling of data columns in a database table.

As shown in FIG. 12, the graphical user interface 1200 includes a window 1210 that displays a database table 1230. Two columns of data are shown in the database table 1230 for illustration purposes. As shown, the first column data has an initial label "CTRY," and the second column data has an initial label "CCode." A user can enter a command, e.g., by clicking a "Name Columns" button 1220, to make a call to the cluster labeling engine that implements the intelligent labeling algorithm described above. As shown in FIG. 13, the resulting labels 1240 associated with the two data columns (e.g., "SAP:Country" and "SAP:CountryCode") can be displayed next to the table 1230. The user can have the option to confirm the resulting labels (e.g., by clicking the check button 1244), or manually edit the resulting labels (e.g., by clicking the edit button 1242). When there are more than one resulting labels corresponding to one column of data, the resulting labels 1240 can be displayed in a ranked list (e.g., in a drop-down list) for the user to select. The confirmed, edited, or selected resulting labels can then replace the respective initial labels of the database table 1230.

In other words, the intelligent labeling algorithm described herein can generate and assign a meaningful label corresponding to a column of data in the database table. As described above, such assigned label can be compliant with an existing ontology of a data repository. Thus, a software application interfacing with the data repository can execute a JOIN operation that combines the column of data in the database table (denoted as first database table) with a column of data in another database table (denoted as second database table), wherein the label assigned to the column of data in the first database table is identical to a label of the column of data in the second database table.

Example 16—Example Advantages

A number of advantages can be achieved via the technology described herein. For example, the technology described herein can automatically and intelligently associate data instances with one or more meaningful labels that are defined in the ontology of a knowledge graph and can represent hypernyms for the data instances. Such feature can be particularly useful when it is used in conjunction with artificial intelligence systems that incorporate data clustering algorithms. By using the intelligent labeling algorithm described herein, the data clusters generated by such artificial intelligence systems can be associated with meaningful labels that are human-explainable, thus facilitating data interpretation and analysis. The technology described herein can also support efficient integration of data instances into existing data repository such as data warehouse or data lake. By using ontology mapping between the knowledge graph and the data repository, the labels associated with the data instances and generated by the intelligent labeling algorithm described herein can be translated into and replaced by equivalent labels that are in compliance with the ontology of the data repository, thus allowing fully integration of the data instances into the data repository.

As described above, the technology described herein can work with both public/free knowledge graphs and private/proprietary knowledge graphs. The intelligent labeling algorithm also provides sufficient flexibility for the user to balance the accuracy and efficiency of operations. For example, by specifying configuration parameters (e.g., sampling ratio, commonality threshold, matching coverage ratio, etc., as noted above), the user can adjust the accuracy of the labels, the complexity of searches, and the robustness of the algorithm against noises in the data.

Example 17—Example Computing Systems

Figure 14:
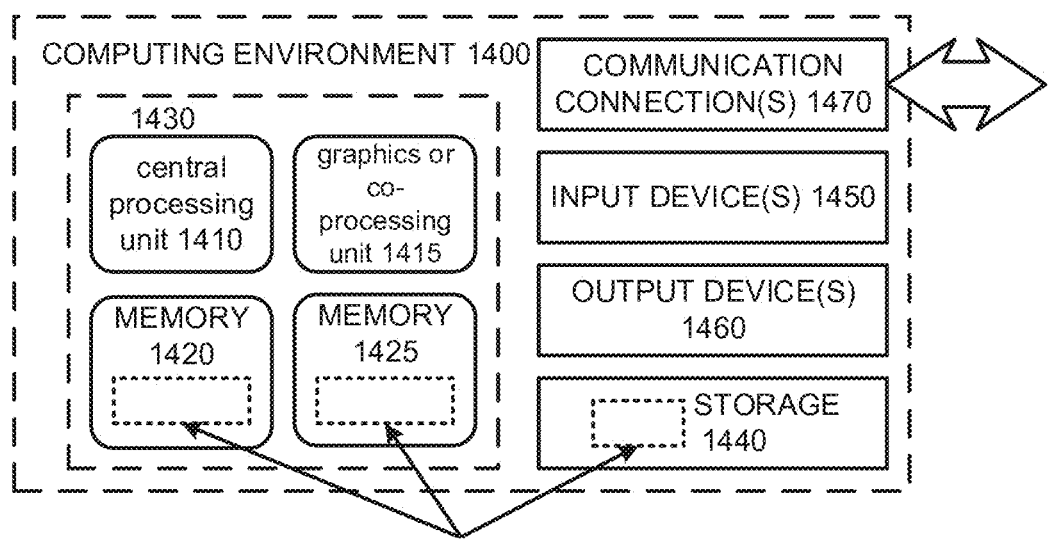
FIG. 14 is a block diagram of an example computing system in which described embodiments can be implemented.

FIG. 14 depicts an example of a suitable computing system 1400 in which the described innovations can be implemented. The computing system 1400 is not intended to suggest any limitation as to scope of use or functionality of the present disclosure, as the innovations can be implemented in diverse computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 can be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415.

A computing system 1400 can have additional features. For example, the computing system 1400 includes storage 1440, one or more input devices 1450, one or more output devices 1460, and one or more communication connections 1470, including input devices, output devices, and communication connections for interacting with a user. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 can be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software implementing one or more innovations described herein.

The input device(s) 1450 can be an input device such as a keyboard, mouse, pen, or trackball, a voice input device, a scanning device, touch device (e.g., touchpad, display, or the like) or another device that provides input to the computing system 1400. The output device(s) 1460 can be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 18—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example 19—Example Cloud Computing Environment

Figure 15:
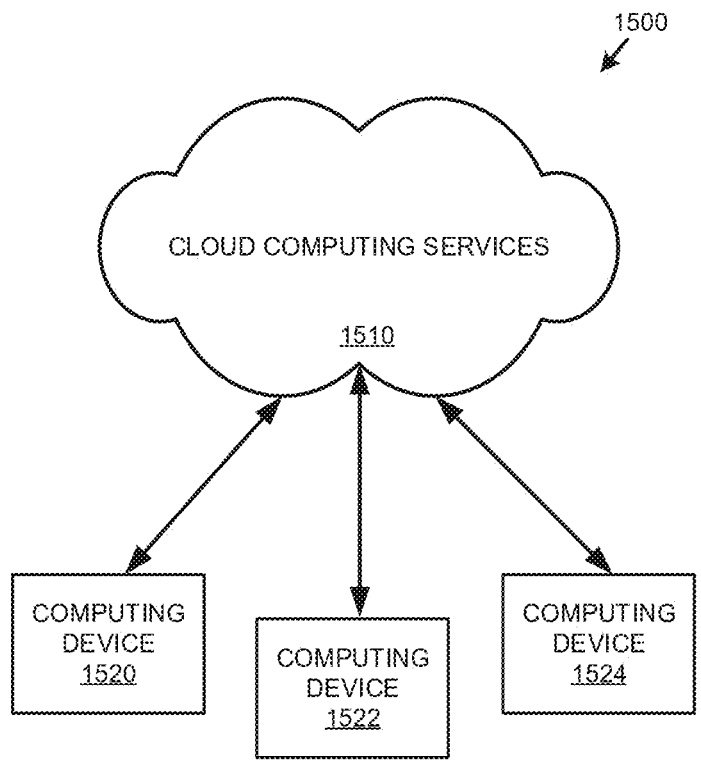
FIG. 15 is a block diagram of an example cloud computing environment that can be used in conjunction with the technologies described herein.

FIG. 15 depicts an example cloud computing environment 1500 in which the described technologies can be implemented, including, e.g., the system disclosed above and other systems herein. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries).

The cloud computing services 1510 are utilized by various types of computing devices (e.g., client computing devices), such as computing devices 1520, 1522, and 1523. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

In practice, cloud-based, on-premises-based, or hybrid scenarios can be supported.

Example 20—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 21—Example Embodiments

Any of the following embodiments can be implemented.
Clause 1. A computer-implemented method comprising:
receiving a plurality of input instances;
accessing a knowledge graph comprising a plurality of nodes and a plurality of edges connecting the plurality of nodes, wherein the plurality of nodes represent objects and the plurality of edges represent relationship between the objects;
for at least some selected input instances, identifying respective matching objects represented by corresponding nodes of the knowledge graph, wherein a selected input instance shares a common label with the corresponding matching object;
for identified matching objects, identifying a common class object represented by a corresponding node of the knowledge graph, wherein a percentage of identified matching objects are descendants of the common class object, wherein the percentage is greater than a predefined threshold; and
associating a label of the common class object with the plurality of input instances.

Clause 2. The computer-implemented method of clause 1, wherein the plurality of input instances comprise a column of data in a first database table, wherein associating a label of the common class object with the plurality of input instances comprises assigning the label to the column of data in the first database table.

Clause 3. The computer-implemented method of clause 2, further comprising executing a JOIN operation that combines the column of data in the first database table with a column of data in a second database table, wherein the label assigned to the column of data in the first database table is identical to a label of the column of data in the second database table.

Clause 4. The computer-implemented method of any one of clauses 1-3, further comprising translating the label associated with the plurality of input instances to an equivalent label defined in an ontology dictionary, wherein the ontology dictionary maps ontology of the knowledge graph to ontology of a data repository.

Clause 5. The computer-implemented method of clause 4, further comprising replacing the label associated with the plurality of input instances to the equivalent label, and adding the plurality of input instances and the equivalent label to the data repository.

Clause 6. The computer-implemented method of any one of clauses 1-5, wherein the common class object is one of a plurality of common class objects, wherein the method further comprises ranking the plurality of common class objects and presenting labels of the plurality of common class objects in a ranked list.

Clause 7. The computer-implemented method of clause 6, wherein ranking the plurality of common class objects is based on number of edges connecting nodes representing the identified matching objects to a node representing a respective common class object or the percentage of identified matching objects that are descendants of the respective common class object.

Clause 8. The computer-implemented method of any one of clauses 1-7, wherein the at least some selected input instances are randomly sampled from the plurality of input instances.

Clause 9. The computer-implemented method of any one of clauses 1-8, wherein identifying the common class object corresponding to the identified matching objects comprises iteratively searching ancestor nodes, wherein the ancestor nodes are connected to nodes representing the identified matching objects by one or more edges.

Clause 10. The computer-implemented method of clause 9, wherein the one or more edges connecting the ancestor nodes and the nodes representing the identified matching objects are defined by a set of properties, wherein the set of properties comprise a type property and/or a subclass-of property.

Clause 11. A system comprising:
a cluster labeling engine in communication with a knowledge graph;
wherein the knowledge graph comprises a plurality of nodes and a plurality of edges connecting the plurality of nodes, wherein the plurality of nodes represent objects and the plurality of edges represent relationship between the objects;
wherein the cluster labeling engine comprises a user interface configured to receive a plurality of input instances, and access the knowledge graph;
an instance matching operator configured to, for at least some selected input instances, identify respective matching objects represented by corresponding nodes of the knowledge graph, wherein a selected input instance shares a common label with the corresponding matching object; and
a common class object finder configured to, for identified matching objects, identify a common class object represented by a corresponding node of the knowledge graph, wherein a percentage of identified matching objects are descendants of the common class object, wherein the percentage is greater than a predefined threshold;
wherein the cluster labeling engine is configured to associate a label of the common class object with the plurality of input instances.

Clause 12. The system of clause 11, wherein the plurality of input instances comprise a column of data in a first database table, wherein the cluster labeling engine is configured to assign the label to the column of data in the first database table, wherein the system is further configured to support a JOIN operation that combines the column of data in the first database table with a column of data in a second database table, wherein the label assigned to the column of data in the first database table is identical to a label of the column of data in the second database table.

Clause 13. The system of any one of clauses 11-12, wherein the cluster labeling engine comprises an ontology translator configured to translate the label associated with the plurality of input instances to an equivalent label defined in an ontology dictionary, wherein the ontology dictionary maps ontology of the knowledge graph to ontology of a data repository.

Clause 14. The system of clause 13, wherein the cluster labeling engine is further configured to replace the label associated with the plurality of input instances to the equivalent label, and adding the plurality of input instances and the equivalent label to the data repository.

Clause 15. The system of any one of clauses 11-14, wherein the common class object is one of a plurality of common class objects, wherein the cluster labeling engine further comprises a ranking operator configured to rank the plurality of common class objects and present labels of the plurality of common class objects in a ranked list.

Clause 16. The system of clause 15, wherein the ranking operator is configured to rank the plurality of common class objects based on number of edges connecting nodes representing the identified matching objects to a node representing a respective common class object.

Clause 17. The system of clause 15, wherein the ranking operator is configured to rank the plurality of common class objects based on the percentage of identified matching objects that are descendants of a respective common class object.

Clause 18. The system of any one of clauses 11-17, wherein the common class object finder is configured to identify the common class object corresponding to the identified matching objects by iteratively searching ancestor nodes, wherein the ancestor nodes are connected to nodes representing the identified matching objects by one or more edges.

Clause 19. The system of clause 18, wherein the one or more edges connecting the ancestor nodes and the nodes representing the identified matching objects are defined by a set of properties, wherein the set of properties comprise a type property and/or a subclass-of property.

Clause 20. One or more computer-readable media having encoded thereon computer-executable instructions causing one or more processors to perform a method comprising:
receiving a plurality of input instances selected from a column of data in a database table;
accessing a knowledge graph comprising a plurality of nodes and a plurality of edges connecting the plurality of nodes, wherein the plurality of nodes represent objects and the plurality of edges represent relationship between the objects;
for the plurality of input instances, identifying respective matching objects represented by corresponding nodes of the knowledge graph, wherein an input instance shares a common label with the corresponding matching object;
for identified matching objects, identifying a common class object represented by a corresponding node of the knowledge graph, wherein a percentage of identified matching objects are descendants of the common class object, wherein the percentage is greater than a predefined threshold;
assigning a label of the common class object to the column of data in the database table;
translating the label associated with the plurality of input instances to an equivalent label defined in an ontology dictionary, wherein the ontology dictionary maps ontology of the knowledge graph to ontology of a data repository; and
replacing the label assigned to the column of data in the database table to the equivalent label, and adding the column of data in the database table and the equivalent label to the data repository.

Example 22—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

The invention claimed is:
1. A computer-implemented method comprising:
receiving a plurality of input instances;
accessing a knowledge graph comprising a plurality of nodes and a plurality of edges connecting the plurality of nodes, wherein the plurality of nodes represent objects and the plurality of edges represent relationship between the objects;
for at least some selected input instances, identifying respective matching objects represented by correspond- ing nodes of the knowledge graph, wherein a selected input instance shares a common label with the corresponding matching object;

for identified matching objects, identifying a common class object represented by a corresponding node of the knowledge graph, wherein a percentage of identified matching objects are descendants of the common class object, wherein the percentage is greater than a predefined threshold; and associating a label of the common class object with the plurality of input instances, wherein the common class object is one of a plurality of common class objects, wherein the method further comprises ranking the plurality of common class objects and presenting labels of the plurality of common class objects in a ranked list, wherein ranking the plurality of common class objects is based on number of edges connecting nodes representing the identified matching objects to a node representing a respective common class object or the percentage of identified matching objects that are descendants of the respective common class object.

2. The computer-implemented method of claim 1, wherein the plurality of input instances comprise a column of data in a first database table, wherein associating a label of the common class object with the plurality of input instances comprises assigning the label to the column of data in the first database table.

3. The computer-implemented method of claim 2, further comprising executing a JOIN operation that combines the column of data in the first database table with a column of data in a second database table, wherein the label assigned to the column of data in the first database table is identical to a label of the column of data in the second database table.

4. The computer-implemented method of claim 1, further comprising translating the label associated with the plurality of input instances to an equivalent label defined in an ontology dictionary, wherein the ontology dictionary maps ontology of the knowledge graph to ontology of a data repository.

5. The computer-implemented method of claim 4, further comprising replacing the label associated with the plurality of input instances to the equivalent label, and adding the plurality of input instances and the equivalent label to the data repository.

6. The computer-implemented method of claim 1, wherein the at least some selected input instances are randomly sampled from the plurality of input instances.

7. The computer-implemented method of claim 1, wherein identifying the common class object corresponding to the identified matching objects comprises iteratively searching ancestor nodes, wherein the ancestor nodes are connected to nodes representing the identified matching objects by one or more edges.

8. The computer-implemented method of claim 7, wherein the one or more edges connecting the ancestor nodes and the nodes representing the identified matching objects are defined by a set of properties, wherein the set of properties comprise a type property and/or a subclass-of property.

9. A system comprising:

a cluster labeling engine in communication with a knowledge graph;

wherein the knowledge graph comprises a plurality of nodes and a plurality of edges connecting the plurality of nodes, wherein the plurality of nodes represent objects and the plurality of edges represent relationship between the objects;

wherein the cluster labeling engine comprises a user interface configured to receive a plurality of input instances, and access the knowledge graph;

an instance matching operator configured to, for at least some selected input instances, identify respective matching objects represented by corresponding nodes of the knowledge graph, wherein a selected input instance shares a common label with the corresponding matching object; and a common class object finder configured to, for identified matching objects, identify a common class object represented by a corresponding node of the knowledge graph, wherein a percentage of identified matching objects are descendants of the common class object, wherein the percentage is greater than a predefined threshold;

wherein the cluster labeling engine is configured to associate a label of the common class object with the plurality of input instances, wherein the common class object is one of a plurality of common class objects, wherein the cluster labeling engine further comprises a ranking operator configured to rank the plurality of common class objects and present labels of the plurality of common class objects in a ranked list, wherein the ranking operator is configured to rank the plurality of common class objects based on number of edges connecting nodes representing the identified matching objects to a node representing a respective common class object or the percentage of identified matching objects that are descendants of a respective common class object.

10. The system of claim 9, wherein the plurality of input instances comprise a column of data in a first database table, wherein the cluster labeling engine is configured to assign the label to the column of data in the first database table, wherein the system is further configured to support a JOIN operation that combines the column of data in the first database table with a column of data in a second database table, wherein the label assigned to the column of data in the first database table is identical to a label of the column of data in the second database table.

11. The system of claim 9, wherein the cluster labeling engine comprises an ontology translator configured to translate the label associated with the plurality of input instances to an equivalent label defined in an ontology dictionary, wherein the ontology dictionary maps ontology of the knowledge graph to ontology of a data repository.

12. The system of claim 11, wherein the cluster labeling engine is further configured to replace the label associated with the plurality of input instances to the equivalent label, and adding the plurality of input instances and the equivalent label to the data repository.

13. The system of claim 9, wherein the common class object finder is configured to identify the common class object corresponding to the identified matching objects by iteratively searching ancestor nodes, wherein the ancestor nodes are connected to nodes representing the identified matching objects by one or more edges.

14. The system of claim 13, wherein the one or more edges connecting the ancestor nodes and the nodes representing the identified matching objects are defined by a set of properties, wherein the set of properties comprise a type property and/or a subclass-of property.

15. One or more non-transitory computer-readable media having encoded thereon computer-executable instructions causing one or more processors to perform a method comprising:
- receiving a plurality of input instances selected from a column of data in a database table; accessing a knowledge graph comprising a plurality of nodes and a plurality of edges connecting the plurality of nodes, wherein the plurality of nodes represent objects and the plurality of edges represent relationship between the objects;
- for the plurality of input instances, identifying respective matching objects represented by corresponding nodes of the knowledge graph, wherein an input instance shares a common label with the corresponding matching object;
- for identified matching objects, identifying a common class object represented by a corresponding node of the knowledge graph, wherein a percentage of identified matching objects are descendants of the common class object, wherein the percentage is greater than a predefined threshold;
- assigning a label of the common class object to the column of data in the database table;
- translating the label associated with the plurality of input instances to an equivalent label defined in an ontology dictionary, wherein the ontology dictionary maps ontology of the knowledge graph to ontology of a data repository; and
- replacing the label assigned to the column of data in the database table to the equivalent label, and adding the column of data in the database table and the equivalent label to the data repository,
- wherein the common class object is one of a plurality of common class objects, wherein the method further comprises ranking the plurality of common class objects and presenting labels of the plurality of common class objects in a ranked list,
- wherein ranking the plurality of common class objects is based on number of edges connecting nodes representing the identified matching objects to a node representing a respective common class object or the percentage of identified matching objects that are descendants of the respective common class object.

\* \* \* \* \*